US009098967B2

(12) United States Patent
Erickson et al.

(10) Patent No.: US 9,098,967 B2
(45) Date of Patent: Aug. 4, 2015

(54) CONTROLLING WAGERING GAME PERIPHERALS

(71) Applicant: WMS Gaming, Inc., Waukegan, IL (US)

(72) Inventors: Eric V. Erickson, Mt Prospect, IL (US); Sean P. Kelly, Chicago, IL (US); Jesse M. Smith, Chicago, IL (US); Martin R. Ugarte, Jr., Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 63 days.

(21) Appl. No.: 13/631,120

(22) Filed: Sep. 28, 2012

(65) Prior Publication Data

US 2013/0084975 A1 Apr. 4, 2013

Related U.S. Application Data

(60) Provisional application No. 61/540,675, filed on Sep. 29, 2011.

(51) Int. Cl.
*A63F 13/40* (2014.01)
*G07F 17/32* (2006.01)

(52) U.S. Cl.
CPC ........ *G07F 17/3209* (2013.01); *G07F 17/3223* (2013.01)

(58) Field of Classification Search
CPC ......................... G07F 17/3209; G07F 17/3223
USPC .......................................... 463/40–42, 46, 47
See application file for complete search history.

(56) References Cited

U.S. PATENT DOCUMENTS

| | | | |
|---|---|---|---|
| 6,846,238 | B2 | 1/2005 | Wells |
| 7,510,474 | B2 | 3/2009 | Carter, Sr. |
| 7,611,409 | B2 | 11/2009 | Muir et al. |
| 7,699,703 | B2 | 4/2010 | Muir et al. |
| 7,850,528 | B2 | 12/2010 | Wells |

(Continued)

FOREIGN PATENT DOCUMENTS

| | | |
|---|---|---|
| EP | 1384213 | 1/2004 |
| EP | 1791098 | 5/2007 |

(Continued)

*Primary Examiner* — Ronald Laneau
*Assistant Examiner* — Ross Williams
(74) *Attorney, Agent, or Firm* — DeLizio Law, PLLC

(57) ABSTRACT

A wagering game system and its operations are described herein. In some embodiments, the operations can include establishing a connection with an input device, from a plurality of input devices configured for user input, for use in a wagering game during a wagering game session. The operations can further include receiving input data from the input device, wherein the input data has a first format specific to the input device, and wherein the wagering game requires the input data in a second format different from the first format. The operations can further include converting the input data from the first format to the second format required by the wagering game, and providing the input data to the wagering game in the second format for use as the user input for the wagering game.

30 Claims, 9 Drawing Sheets

(56) References Cited

U.S. PATENT DOCUMENTS

| | | | | |
|---|---|---|---|---|
| 2003/0064805 | A1 | 4/2003 | Wells | |
| 2005/0101383 | A1* | 5/2005 | Wells | 463/39 |
| 2006/0189382 | A1 | 8/2006 | Muir et al. | |
| 2007/0021198 | A1 | 1/2007 | Muir et al. | |
| 2008/0026844 | A1 | 1/2008 | Wells | |
| 2011/0086706 | A1* | 4/2011 | Zalewski | 463/36 |
| 2012/0118947 | A1 | 5/2012 | Lyons et al. | |
| 2012/0122528 | A1 | 5/2012 | Lyons et al. | |
| 2012/0122529 | A1 | 5/2012 | Lyons | |
| 2012/0122558 | A1 | 5/2012 | Lyons et al. | |

FOREIGN PATENT DOCUMENTS

| | | |
|---|---|---|
| EP | 1969570 | 7/2007 |
| EP | 1857987 | 11/2007 |
| EP | 1444662 | 12/2012 |
| WO | WO-02058020 | 7/2002 |
| WO | WO-03027970 | 4/2003 |
| WO | WO-2007075380 | 7/2007 |
| ZA | 200402387 | 8/2004 |

* cited by examiner (TOP VIEW)

(SIDE VIEW)

CONTROLLING WAGERING GAME PERIPHERALS

RELATED APPLICATIONS

This patent application is a non-provisional patent application of, and claims priority benefit from, U.S. Provisional Patent Application No. 61/540,675, filed Sep. 29, 2011.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, control wagering game peripherals.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Further, manufacturers of devices used to generate input for a wagering game are continuously developing new devices and revising already existing devices. Devices that are used to generate input for a wagering game are often connected to a wagering game machine and are sometimes called "peripherals." Quite often, manufacturers of the peripherals are separate entities from manufacturers of the wagering games. Manufacturers of peripherals may utilize various proprietary formats for data that are generated by the peripherals. When a manufacturer generates a new peripheral, or revises an already existing peripheral, the new and/or revised device often has differences in configuration that can affect the data generated by the new/revised peripherals, which, without specific configurations, makes the peripheral incompatible with existing wagering games. Thus, when peripherals to a wagering game machine change, wagering game manufacturers may have to re-engineer specific aspects of wagering games to work properly with the new and/or updated peripherals. Re-engineering can require substantial monetary and computing resources, can slow product cycles for new or revised wagering game, can introduce potential new errors or security risks, or can present a variety of other challenges.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Figure 1:
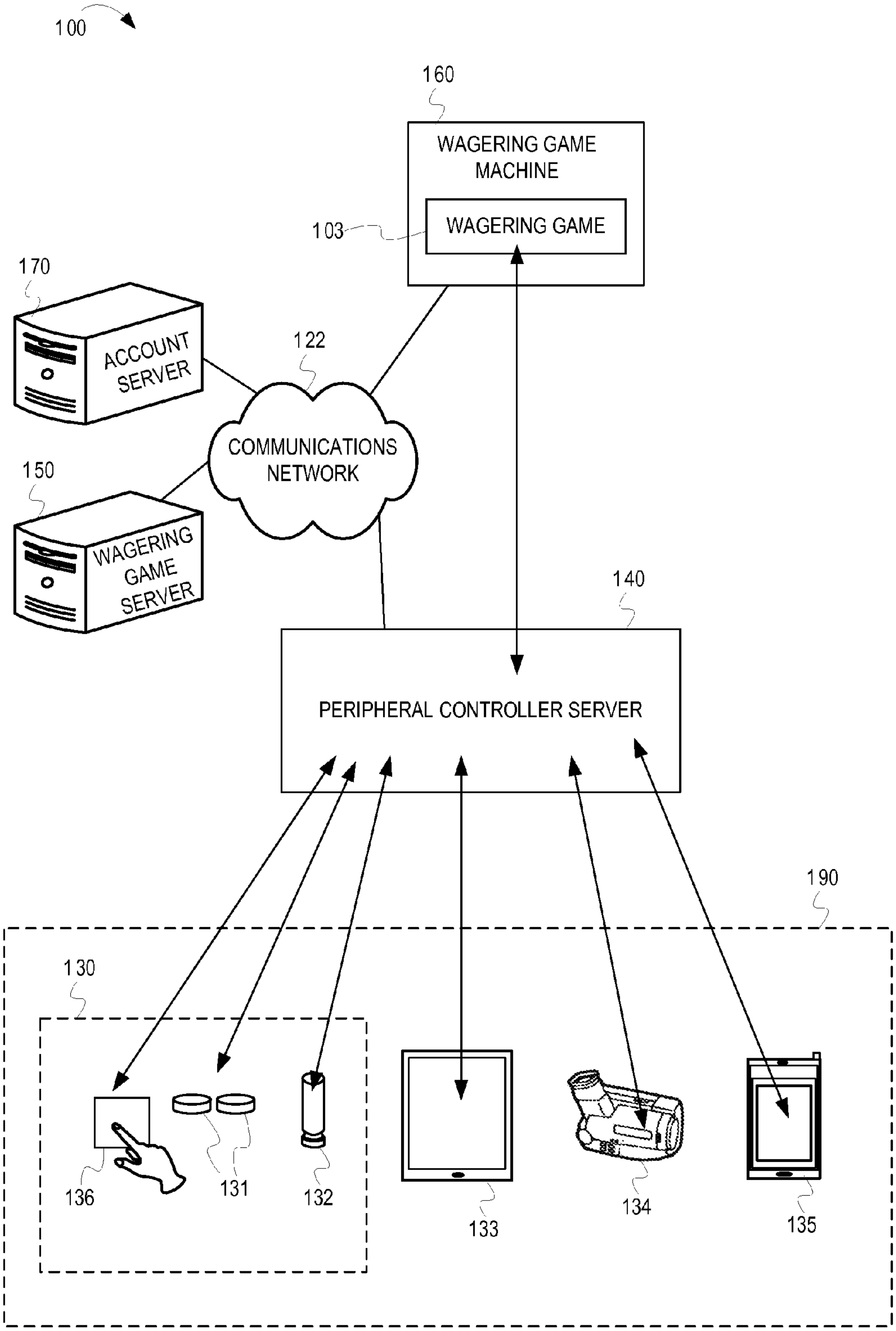
FIG. 1 is an illustration of controlling input data from wagering game peripherals, according to some embodiments.

As indicated previously, wagering game technologies and peripherals associated with a wagering game experience are continuously expanding and evolving, which present specific challenges and may require re-engineering of gaming content for each new peripheral device, or version of a peripheral device, that peripheral device manufacturers create. Some embodiments of the inventive subject matter provide a peripheral controller (e.g., a peripheral control server, a peripheral control module, or a peripheral control process thread) configured with information required to communicate and, when necessary, manipulate data (e.g., convert or reformat data) provided by peripheral devices. The peripheral controller can convert data from one format to another. For instance, the peripheral controller can convert data from a format that an input device was engineered to generate into a different format used by, and understood by, a wagering game. Thus, in some examples, wagering games can be developed with a standardized format for receiving input data for the wagering games and the peripheral controller can convert all data received from different types of peripherals into the standardized format. The peripheral controller thus controls communication with peripherals. In some embodiments, the peripheral controller can connect to multiple peripherals at the same time and convert from many different formats into the one format required by the wagering game during a wagering game session, or across different wagering game sessions. In some embodiments, the peripheral controller can detect when a new peripheral device, which has not been previously used for the wagering game, is connected to the peripheral controller and determine whether the new peripheral device is authorized for use. For example, the peripheral controller can determine whether the peripheral is prohibited for use with a wagering game due to security concerns, jurisdictional rules, etc. In another example, the peripheral controller can detect whether the new peripheral has been previously configured for use and, if not, automatically configure a peripheral that is connected to the peripheral controller. The peripheral controller can further detect whether the peripheral device has capabilities that are required by the wagering game and, if not, utilize a different peripheral connected to the peripheral controller. The previous examples are only a few. Many other examples are possible. FIG. 1 illustrates one such example.

FIG. 1 is a conceptual diagram that illustrates an example of controlling input data from wagering game peripherals, according to some embodiments. In FIG. 1, a wagering game system ("system") 100 includes a peripheral control server 140 connected to a wagering game machine 160, a wagering game server 150, and an account server 170, via a communications network 122. The account server 170 host can host a wagering game player account ("player account") for a user. The user can log in to the wagering game machine 160 to initiate a wagering game session. The wagering game session refers to, and uses, the player account for various purposes, such as to fund wagers, store winnings, provide player profile data (e.g., login information, avatars, preferences, etc.), store player game-play history, and so forth.

A peripheral controller, such as a peripheral control server (PCS) 140, receives input data from one or more input devices 190 (e.g., input capable peripherals) configured to generate data that can be used for use and/or control of applications associated with the wagering game machine 160. The input devices 190 may include input controls 130 associated with a bank device and/or the wagering game machine 160, such as buttons 131, a joystick 132, and a touch screen 136. The input devices 190 may also include a tablet computer 133, a video camera 134, a smart phone 135, or any other type of device capable of detecting user input, whether directly or indirectly provided (e.g., via a computer mice, via rolling of a roller ball, via button press of movement of a fob, via button press or movement of an electronic wand, via flash of a laser pointer, via proximity of a near-field device, via scan of a biometric device, via sensing of head-tracking equipment, via sensing position or movement of a person in a chair, via capturing of sound energy through a microphone, etc.). The input devices 190 may further be devices controlled by computers that provide input in response to wagering game events or other activities that occur within a casino. The input devices 190 are connected to the PCS 140 via wires and/or wirelessly. The input devices 190 may be referred to as "peripherals" to the wagering game machine 160 because they are used to provide information to the wagering game machine 160, and/or content provided via the wagering game machine 160, regarding a player's actions during a wagering game session. The peripheral control server 140 communicates and converts data between the input devices 190 and the wagering game machine 160. The PCS 140 receives data from the input devices 190 in a variety of data formats that are specific to each of the input devices 190 and their respective applications. For example, when any one of the input devices 190 is used (e.g., a button is pressed, a screen in touched, a mouse is moved, an object is selected, a device is rotated or accelerated, etc.), the one of the input devices 190 that is used can generate data. The data can be related to spatial coordinates, button state, joystick state, screen touch-point coordinates, graphical-user-interface (GUI) button state, key press state, text strings, gyroscopic movement, accelerometer data, camera data, video tracking position, video tracking velocity, pointer orientation, voice commands, etc. For example, during a wagering game session, the wagering game machine 160 presents wagering game content (e.g., a wagering game 103) associated with a wagering game application. A user can initiate a connection of one of the input devices 190 (e.g., the smart phone 135) to use as an input device for the wagering game 103 presented and/or controlled via the wagering game machine 160 and/or the wagering game server 150. The PCS 140 can establish the connection with the smart phone 135. When the user uses the smart phone 135 to indicate input for the wagering game 103, the smart phone 135 generates data in at least one format specified by a manufacturer of the smart phone 135. Different manufacturers of different devices often utilize their own proprietary formats related to content, communication, data types, protocols, etc. On the other hand, the wagering game 103 requires input in a format that is different from the format associated with the smart phone 135. For instance, in some embodiments, the wagering game 103 requires input data in a specific format that is standardized for a variety of wagering game types, manufacturers, etc. In other words, the wagering game 103 communicates and/or understands data in a first format, while the smart phone 135 communicates and/or understands data in a second format different from the first format. Any others of the input devices 190 may also communicate and/or understand data in the second format, or other hardware-specific formats, that are also different from the first format. The PCS 140 converts the second format, for the smart phone 135, and/or other formats for others of the input devices 190, to the first format and communicates the data from the input devices 190 (e.g., from the smart phone 135) to the wagering game (e.g., via a socket of a software application for the wagering game 103). Further, when the wagering game needs to communicate with the smart phone 135, the PCS 140 converts data from the wagering game 103 from the first format to the second format required by the smart phone 135

Some embodiments of the inventive subject matter include controlling wagering game peripherals in a network wagering venue (e.g., an online casino, a wagering game website, a wagering network, etc.) using a communication network, such as the communications network 122 in FIG. 1. Some embodiments can be presented over any type of communications network that provides access to wagering games, such as a public network (e.g., a public wide-area-network, such as the Internet), a private network (e.g., a private local-area-network gaming network), a file sharing network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
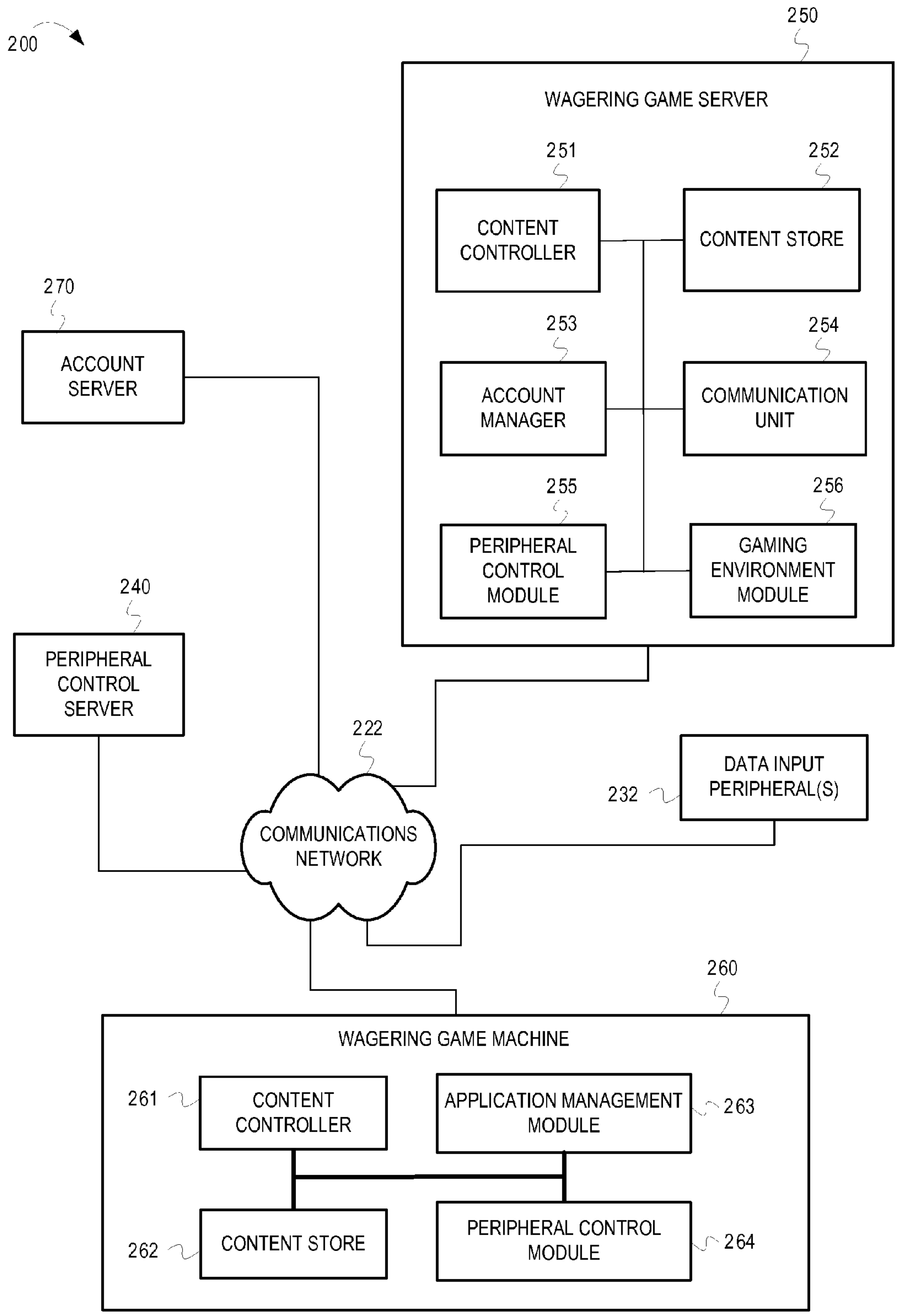
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks. The account server 270 can store wagering game player account information, such as account settings (e.g., settings related to group games, settings related to social contacts, etc.), preferences (e.g., player preferences regarding peripherals, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for presentation on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. In some embodiments, the content controller 251 is further configured to provide content, and control information, for secondary games and other secondary content available on a wagering game network (e.g., secondary wagering game content, promotions content, advertising content, player tracking content, web content, etc.). The content controller 251 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the content controller 251 can provide and control content for community games, including networked games, social games, competitive games, or any other game that multiple players can participate in at the same time. In some embodiments, the content controller 251 can control and present an online website that hosts wagering games. The content controller 251 can also be configured to present multiple wagering game applications on the wagering game machine 260 via a wagering game website, or other gaming-type venue accessible via the Internet. The content controller 251 can host an online wagering website and/or a social networking website. The content controller 251 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). In some embodiments, the content controller 251 can also host social networking accounts, provide social networking content, control social networking communications, store associated social contacts, etc. The content controller 251 can also provide chat functionality for a social networking website, a chat application, or any other social networking communications mechanism. In some embodiments, the content controller 251 can utilize player data to determine marketing promotions that may be of interest to a player account. The content controller 251 can also analyze player data and generate analytics for players, group players into demographics, integrate with third party marketing services and devices, etc. The content controller 251 can also provide player data to third parties that can use the player data for marketing. In some embodiments, the content controller 251 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message. The content controller 251 is further configured to provide and control content for community games, including networked games, social games, competitive games, or any other game that multiple players can participate in at the same time and/or that multiple participants are eligible to participate in when a given playing round, or other event, occurs for the community game.

The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a peripheral control module 255 configured to control communication and/or conversion of data from, or to, input devices, or "peripherals."

The wagering game server 250 can also include a gaming environment module 256 configured to present environmental light and sound effects in a casino environment. The gaming environment module 256 is further configured to provide content data, user data, and control information regarding gaming effects within a casino environment. For example, the gaming environment module 256 can coordinate a synchronized presentation of lighting and sound effects across a bank of wagering game machines and/or other lighting and sound producing devices within one or more areas of a casino. The gaming environment module 256 can also be configured to detect gaming events, such as events generated by the wagering game server 250 and/or the wagering game machine 260. The gaming environment module 256 can generate data for a synchronized light/sound show based on the gaming events. The gaming environment module 256 can control environmental light presentation devices within a casino. The gaming environment module 256 can provide emotive lighting presentation data, including light presentation commands on emotive lighting devices on or near wagering game machines, as well as other devices within the casino such as spotlights, overhead emotive lighting, projectors, etc. The gaming environment module 256 can be configured to determine multi-media, casino-content, including casino-wide special effects that include sound effects and light effects. The multi-media casino content can be presentable across a plurality of casino content presentation devices ("presentation devices") in a casino. The multi-media, casino-content effect can be related to a wagering game presentation or event. The wagering game presentation or event can be tied to the functionality, activity, or purpose of a wagering game. For instance, wagering game presentations can be related to attracting wagering game players to groups of wagering game machines, presenting game related outcomes across multiple wagering game machines, expressing group gaming activity across multiple wagering game machines, focusing attention on a particular person or machine in response to a gaming event, etc. The presentation devices present sound and light effects that accompany a gaming event (e.g., a jackpot celebratory effect that focuses on a wagering game machine, a lightning strike that introduces a community gaming event, and a musical chair game that reveals a community wagering game winner). The gaming environment module 256 can also be configured to determine timing control data for the multi-media effect. In some embodiments, timing control data can be stored on the wagering game server 250, or be accessible to the gaming environment module 256 via another device (e.g., a lighting controller associated with a bank of wagering game machines), to use to send lighting commands in sequential order to network addresses of presentation device on a casino network. The gaming environment module 256 can determine channels assigned with casino-content presentation devices, such as the wagering game machine 260. In some embodiments, the presentation devices can have addresses assigned to a channel. For example, the wagering game machine 260 could be on one channel, peripheral devices could be on another channel, network light presentation devices can be on other channels, etc. In some embodiments, the gaming environment module 256 can be a DMX controller connected in parallel to an emotive lighting controller on, or associated with, the wagering game machine 260. The DMX controller can also be connected in parallel to a plurality of other presentation devices (e.g., other wagering game machines, lighting presentation devices, etc.) within a casino, and can simultaneously provide DMX lighting commands to the wagering game machine 260 and to the other presentation devices. DMX can change light intensity, or other light characteristics, over time. Some embodiments of DMX controllers can update commands very quickly (e.g., 30-47 times a second) across multiple channels (e.g., 512 channels). A DMX controller can put different commands in every channel (e.g., one channel can have show "X," one channel can have show "Y," etc.). The DMX can also have a frame number within a show. Some devices can take up more than one channel (e.g., an emotive light might have three colors and may take up a channel for each color, a spotlight might have seven channels, etc.). Each device can receive 512 bytes of data from the DMX controller at any given time interval (e.g., frame). The 512 bytes of data can be divided in different ways. For example, 6 bytes may address light effect behavior, 6 bytes may include show numbers, 6 bytes may include frame numbers, 1 byte may include priority values, and so on for various light effect characteristics (e.g., intensity, color, pan, tilt, etc.). The presentation device that receives the DMX command data is programmed to interpret the lighting data in the channel. In some embodiments, the presentation devices can be DMX compliant including having a DMX input port to accept DMX commands. In some embodiments, presentation devices can convert the DMX commands to proprietary commands. In addition to the DMX protocol, other types of dedicated lighting protocols can include AMX 192, CMX, SMX, PMX, protocols included in the EIA-485 standard, etc.

The wagering game system architecture 200 can also include the wagering game machine 260 configured to present wagering games and receive and transmit information to control wagering game peripherals. The wagering game machine 260 can include a content controller 261 configured to manage and control content and presentation of content on the wagering game machine 260. The content controller 261 is further configured to work in conjunction with an application management module 263 to perform instructions received by, and or generate instructions on behalf of, an application management module 263, such as, to manipulate and control windows, or other user interfaces, presented on the wagering game machine 260. The content controller 261 is further configured to control and communicate account information (e.g., financial transactions, player tracking information, etc.). The content controller 261 is further configured to present secondary content applications (e.g., client player instances). The content controller 261 can receive event data from, and provide event data to, the application management module 263. The content controller 261 is further configured to manage and control the presentation of secondary content on the wagering game machine 260, which secondary content is specific to one or more secondary content clients.

The wagering game machine 260 can also include a content store 262 configured to contain content to present on the wagering game machine 260. The wagering game machine 260 can also include the application management module 263 configured to manage multiple instances of gaming applications. For example, the application management module 263 can be configured to launch, load, unload and control applications and instances of applications. The application management module 263 can launch different software players (e.g., a Microsoft® Silverlight™ player, an Adobe® Flash® player, etc.) and manage, coordinate, and prioritize what the software players do. The application management module 263 can also coordinate instances of server applications in addition to local copies of applications. The application management module 263 can control window locations on a wagering game screen or display for the multiple gaming applications. In some embodiments, the application management module 263 can manage window locations on multiple displays including displays on devices associated with and/or external to the wagering game machine 260 (e.g., a top display and a bottom display on the wagering game machine 260, a peripheral device connected to the wagering game machine 260, a mobile device connected to the wagering game machine 260, etc.). The application management module 263 can manage priority or precedence of client applications that compete for the same display area. For instance, the application management module 263 can determine each client application's precedence. The precedence may be static (i.e. set only when the client application first launches or connects) or dynamic. The applications may provide precedence values to the application management module 263, which the application management module 263 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 263 of its current presentation state. The applications may provide presentation state values to the application management module 263, which the application management module 263 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 263 can be pre-configurable. The system can provide controls and interfaces for operators to control screen layouts and other presentation features for the configuring of the application management module 263. The application management module 263 can communicate with, and/or be a communication mechanism for, a base game stored on a wagering game machine. For example, the application management module 263 can communicate events from the base game such as the base game state, pay line status, bet amount status, etc. The application management module 263 can also provide events that assist and/or restrict the base game, such as providing bet amounts from secondary gaming applications, inhibiting play based on gaming event priority, etc. The application management module 263 can also communicate some (or all) financial information between the base game and other applications including amounts wagered, amounts won, base game outcomes, etc. The application management module 263 can also communicate pay table information such as possible outcomes, bonus frequency, etc.

In some embodiments, the application management module 263 can control different types of applications. For example, the application management module 263 can perform rendering operations for presenting applications of varying platforms, formats, environments, programming languages, etc. For example, the application management module 263 can be written in one programming language format (e.g., Javascript, Java, C++, etc.) but can manage, and communicate data from applications that are written in other programming languages or that communicate in different data formats (e.g., Adobe® Flash®, Microsoft® Silverlight™, Adobe® Air™, hyper-text markup language, etc.). The application management module 263 can include a portable virtual machine capable of generating and executing code for the varying platforms, formats, environments, programming languages, etc. The application management module 263 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 260 can also include a peripheral control module 264 configured to control communication and/or conversion of data from, or to, input devices/peripherals.

The wagering game system architecture 200 can also include a peripheral control server 240 configured to receive content from multiple input devices and convert formats of data from the input devices to a format readable and understandable by a wagering game. The peripheral control server 240 can, in some examples, be incorporated into an electronics board that plugs in over Universal Serial Bus (USB) to the content controllers 251 and/or 261, or one or more other content controllers (e.g., processors). In some embodiments, firmware on the board can be updated to accommodate a new input device from a manufacturer. In some embodiments, the peripheral control server 240 is a standalone server box with a plurality of hardware ports that can serve the wagering game machine 260, and/or groups ("banks") of wagering game machines. In some embodiments, the peripheral control server 240 can provide and control mobile content and communications, such as email, text messages, instant messages, mobile applications, etc. The peripheral control server 240 can utilize GSM (Global System for Mobile communications) protocols, the Short Message Service (SMS), Bluetooth, or other communication standards associated with mobile communications, text messaging, email, instant messaging, mobile applications, etc. In some embodiments, the peripheral control server 240 can utilize messaging, DMX, or other such communication structures as a primary mechanism of communication to wagering games or as a path for implementation on legacy gaming system.

The wagering game system architecture 200 can also include one or more data input peripheral device(s) ("data input peripheral") 232 configured to control mobile communications and applications. In some embodiments, the data input peripheral 232 is one or more of joystick, a button, a touch screen, a tablet computer, a camera, a smart phone, a mouse, a roller-ball, a fob, a wand, a light, a near-field device, a biometric scanner, head-tracking equipment, a sensor, or any other type of device capable of detecting user input, whether provided directly or indirectly. In some embodiments, the data input peripheral 232 may be a handheld device or a handheld computer. In some embodiments, the data input peripheral 232 is a pocket-sized computing device having a display screen with touch input and/or a miniature keyboard. Some examples of the mobile devices may include, but are not limited to, a smartphone, a personal digital assistant, a mobile computer, a mobile internet device, a portable media player, a mobile phone, a pager, a personal navigation device, etc. In some embodiments, the one or more data input devices 232 may include integrated data capture devices like barcode readers, radio frequency identification (RFID) readers, and smart card readers. In some embodiments the data input peripheral 232 is personal (i.e., belongs to a user), which the user can carry on their person.

Each component shown in the wagering game system architecture 200 is shown as a separate and distinct element connected via a communications network 222. However, some functions performed by one component could be performed by other components. For example, the wagering game server 250 can also be configured to perform functions of the application management module 263, the peripheral control server 240, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
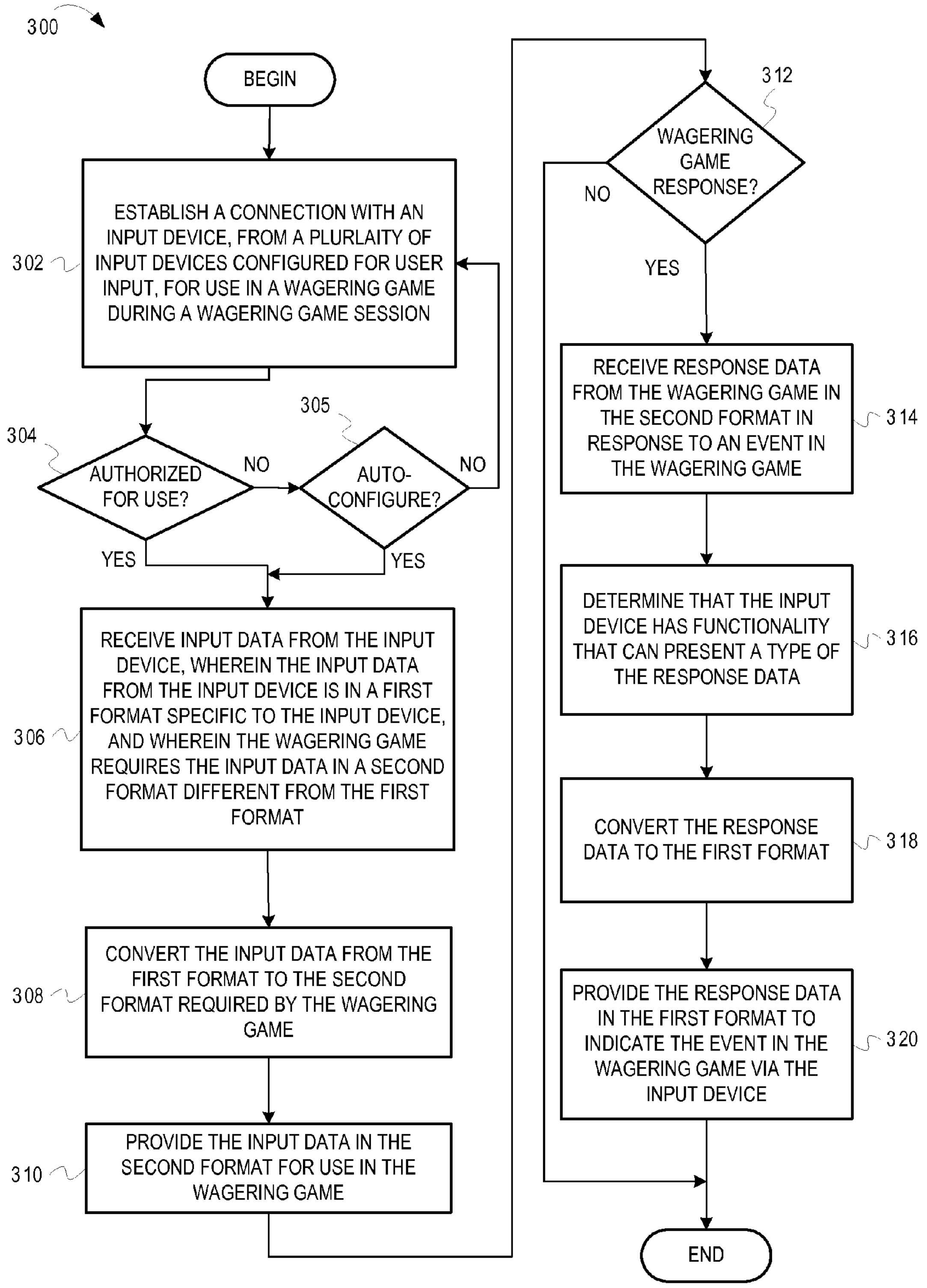
FIG. 3 is a flow diagram 300 illustrating controlling wagering game peripherals, according to some embodiments.

FIG. 3 is a flow diagram ("flow") 300 illustrating controlling wagering game peripherals, according to some embodiments. FIG. 1 is a conceptual diagram that helps illustrate the flow of FIG. 3, according to some embodiments. This description will present FIG. 3 in concert with FIG. 1. In FIG. 3, the flow 300 begins at processing block 302, where a wagering game system ("system") establishes a connection with an input device, from a plurality of input devices configured for user input, for use in a wagering game during a wagering game session. For example, the system can detect that the user input device has been connected, either wirelessly or via a wire, to a board, jack, port, etc. associated with a wagering game machine and/or bank. In some embodiments, the system establishes the connection by opening a communications channel with the input device using a device address for the input device via a network.

The flow 300 continues at processing block 304, where the system determines whether the input device is authorized for use in the wagering game during the wagering game session. The system can check various factors to determine whether the input device is authorized for use and/or levels of authorization, such as whether the device has been pre-configured for use with the particular wagering game, whether the purpose of the use is authorized given the characteristics and/or functionality of the device, whether the input device can generate data required by the wagering game, whether a type of the device is authorized for use based on jurisdictional rules, whether a player and/or player account is authorized to participate in the wagering game, and so forth. If the input device is authorized for use, then the flow 300 continues at block 306. If the input device is not authorized for use, then the flow 300 can determine whether to automatically configure the input device for use or to prohibit the input device from being used. For example, in some embodiments, the system (e.g., the peripheral controller) can function as a firewall and block peripherals which are not allowed, then the flow returns to block 302, and establishes a connection with another input device from the plurality of the input devices until one of the input devices is permitted to be used in the wagering game. In some embodiments, if the peripheral is not blocked, but is simply not yet configured (e.g., if there is no established protocol for getting pre-determined data from the peripheral), then the system may decide to automatically configure, or calibrate, the input device. If the system can, and does, automatically configure the input device for use, then the flow 300 continues at processing block 306. If the system cannot, or does not, automatically configure the input device for use, then the flow 300 returns to block 302. Thus, the system can detect different levels of non-authorization (e.g., strict non-authorization for security purposes or jurisdictional rules, moderate non-authorization subject to an auto-calibration procedure, mixed authorization based on functionality of the input device or purpose of use of the input device, etc.).

In some embodiments, the system can check one or more data sources such as a database, a computer memory, a website, a player profile, a configuration file, etc. to determine information about the device. The system can detect, from the input device, at least one unique identifier that identifies the input device or that indicates where the system can find information about the input device. The system can then search the data sources (e.g., search one or more records in a database, search one or more pages of a websites, etc.) to find the unique identifier and learn about the device, such as characteristics, types of configurations, types of formats and settings, etc. associated with the device. In one embodiment, the system checks a listing to determine whether the device is listed as one of a plurality of authorized/pre-configured devices. In some embodiments, the system searches a data store that specifies types of devices authorized for use during the wagering game session. The system can determine, in response to the searching, that the unique identifier is associated with at least one of the types of devices. The system can, in response, authorize use of the device, for conversion of data and communication with the wagering game. If the input device is not found in a listing of preconfigured devices, and other for any other reason is not pre-authorized or pre-configured for use, the system can automatically configure the input device for use. For example, the system can evaluate characteristics of the device (e.g., detect input types from the new device) and determine how the device communicates. For example, the system can request information from the device and/or other data sources, or query the user regarding the device (e.g., present an interview to the user that indicates for the user to press certain buttons and perform certain activities, which the system then interprets and uses as configuration settings for the device). If the device does not have the information that the system needs to convert data, the system can query additional sources of data (e.g., query a vendor, query an online knowledge base, query a website, etc.) and/or receive instructions and information from an operator. When the system detects an adequate amount of information needed to understand the input device, how the input device works, how the device communicates, what types or formats of information the input device generates, etc., the system can use the information in conversion of the input data. The system can further store the information (e.g., the unique identifier, configuration settings, data format information, etc.) about the input device in a data source (e.g., in a database) so that the system can access the information the next time the input device, or a type of input device, is used for wagering games. In some embodiments, the system can store the information on the device (e.g. in a configuration file, within an application, etc.) that the system can read to and write from when the input device is subsequently connected to the system.

In some embodiments, the system can detect a request from the wagering game for at least one type or amount of input data from the input device. Based on the response, the system can authorize the use of the input device. For example, the wagering game may indicate that only devices that can indicate multiple spatial coordinates, such as "x," "y," and "z" coordinates can be used in the wagering game to move an animated object in an animated, three-dimensional, simulated environment of the wagering game. The system can evaluate characteristics of the input device to determine whether the device is capable of generate the type of input data required by the wagering game. The system may require a limited amount or types of data required for the wagering game application even if the input device can provide more data. The system can, therefore, ensure that the wagering game receives only the limited amount or types of data.

In some embodiments, the system can check jurisdictional rules to determine that a type of the device is authorized for use in gaming. For example, the jurisdiction in which the wagering game is being played, executed, etc., is may allow, or not allow, use of specific types of peripherals or specific functions of a peripheral for gambling purposes. For instance, a jurisdiction may allow use of the input controls for gaming activities, but not allow for near-field communication of monetary type data. In another instance, a jurisdiction may allow for sending of social network images but not allow a screen on the input device to be used as an extension to a primary game screen of a wagering game machine. In another instance, a jurisdiction may prohibit showing an amount of gaming credits on a mobile device.

In some embodiments, the system can ascertain and evaluate a purpose of use indicated by the user input. For example, the system can detect whether the use of the input device is for game versus non-game related activities (e.g. whether the use is for game control, wagering, etc. or whether the use is for control of settings like volume control, display settings, etc.). If the use is for game/monetary related purposes, the system may require specific safeguards, such as that the peripheral is authorized, that the peripheral has sufficient safety features and/or that the peripheral's data is properly sanitized. In some embodiments, depending on the purpose, the system may prevent automated configuration if the system determines that the input device does not appear safe (e.g., if the input device is not from a trusted manufacturer, if a type if the input device has caused security issues in the past, if the input device is not on a current firmware release, etc.).

In some embodiments, the system can verify authentication or login credentials via the input device. For instance, the system can scan user biometrics, such as scanning a user's fingerprints on the device, detecting a user's speech codes or biometric qualities via voice clips, detecting a user's entry of a password entered via a keypad on the input device, etc. When the system authenticates the user, the system can return a unique key to a wagering game machine indicating the player that logs in is authorized. The authentication can connect a pay-in identifier, such as an electronic ticket-in-ticket-out identifier for a player, with the wagering game session. The authentication can access an account-based wagering (ABW) account. The authentication can also access a casino-guest account.

The flow 300 continues at processing block 306, where the system receives input data from the input device, where the input data from the input device is in a first format specific to the input device, and where the wagering game requires the input data in a second format different from the first format. The system can receive input data in response to user input from the input device. In some embodiments, the data can be for controlling a function associated with the wagering game (e.g., a bet, a spin, a selection of an object, etc.). The input data can be for one wagering game, multiple wagering games presented successively during a wagering game session, multiple wagering games presented concurrently during a wagering game session, a community or group wagering game that is played via multiple wagering game machines or devices in a casino, or other scenarios. In some embodiments, the second format is a standardized wagering game format for data, communication protocols, etc. and the first format is a format specific to a manufacturer of the input device. For example, the standardized format can be a USB-HID (universal-serial-bus, human-interface-device) specification, or any other gaming format that is standard to wagering games. The wagering game does not use or understand the first format.

The flow 300 continues at processing block 308, where the system converts the input data from the first format to the second format required by the wagering game. For example, the system can convert from a format understood and used by a smart phone to the standardized format used for the wagering game. In converting, the system can maintain specific data used to indicate a type, degree, or state of an input element. For example, when a user presses a button on a smart phone, the smart phone indicates a state for the button as being pressed. The wagering game may need to know whether the button had been pressed or not. In some embodiments, the system does not modify or convert information that expresses the state of the button (e.g., does not change the data to indicate that the button was not pressed), but converts the formatting of how the input data is communicated, packaged, written, etc. In other embodiments, however, the system can convert the state or nature of the data to appear to represent something other than intended or expressed so that the game can utilize in the altered state. In another example, a wagering game may need to know coordinates data to move or select an item on a screen. The wagering game may expect a specific coordinates grid having a specific range of numbers based on a resolution of a default display. However, if a peripheral is used that has a different range of values on a coordinates grid (e.g., a smart phone typically has a smaller screen than a touch-screen of a wagering game machine), the system may reformat the input data related to movement using the smaller screen of the smart phone to scale up to the size of a screen that the wagering game is expecting. In some embodiments, the converting of the formatting includes rewriting some values, which indicate user input, into different instruction syntax, subroutines, etc. In some embodiments, the system can sanitize data as part of the conversion process. For example, the system may strip specific input data of unnecessary or extraneous data that is not relevant to input required by the wagering game. The system can also detect and eliminate any viruses, malware, rogue attacks, worms, or other potentially harmful data that may have been inserted into the input data.

The flow 300 continues at processing block 310, where the system provides the input data in the second format for use in the wagering game. In some embodiments, the system transmits the input data to a processor configured to access a process thread associated with the wagering game. The game process can receive the data via a generic input listener socket at a receiving end of a standardized protocol. The generic input listener socket is the software endpoint that can establish communication between a program associated with a peripheral controller and a wagering game program. The socket reads the data on the network and communicates it to the wagering game.

The flow 300 continues at processing block 312, where the system determines that the wagering game generates an event in response to the input data. For example, the wagering game may be in a suspended state that awaits the input data (e.g., a wagering game that waits for input from the input device to indicate a spin of reels, a bet on cards, etc.). The wagering game may generate an event that performs specific wagering game activity, in response to receiving the input data, such as an indication that reels are currently spinning, an indication that confirms that a wager was received and/or transacted, etc. If the system detects a wagering game response, then the flow 300 continues at processing block 314. Otherwise, the flow 300 can end.

The flow 300 continues at processing block 314, where the system receives response data from the wagering game in the second format in response to an event in the wagering game. The wagering game may generate response data, directed to the input device, to indicate the event of the wagering game (e.g., the wagering game generates response data that indicates a spinning of the reels, the wagering game generates response data that indicates that a wager was received, etc.). In some embodiments, the response data can be custom game instructions. For example, if a player hits a jackpot, the wagering game may request the input device (e.g., a mobile device equipped with a camera) to take a picture of the player to post on a top-screen. In some embodiments, the response data indicates text-string messages, signals or instructions to generate vibrations, sound information, lighting information, etc.

The flow 300 continues at processing block 316, where the system determines that the input device has functionality that can respond to the response data. The response data may include instructions that are intended to cause the input device to react or behave a specific way (e.g., the wagering game sends response data that intends to cause the input device to vibrate when reels are spinning, the wagering game sends response data that intends to cause the input device to make a sound when a wager is placed, etc.). Thus, the system can analyze or evaluate characteristics, functionality, properties, etc. of the input device, and based on the analysis or evaluation, determine that the input device can perform a function associated with instructions included the response data. For instance, the system can analyze the input device and detect that the input device has a vibrational component (e.g., a gyroscope that can present a vibrational effect for a given duration with a given power level). The system may also detect whether the device can present indicator lights via LEDs, present sounds via a speaker, present a text string as part of a textual message, etc. If the input device lacks one or more of the functionality necessary to effectuate any one, or more, of the instructions included in the response data, then the system may refuse to send the response data to the input device and send the instructions, instead, to one or more others of a plurality of input devices that are associated with the wagering game session (e.g., send the response data, instead, to other devices associated with the wagering game machine). In other embodiments, the system can send to the input device only a portion of the response data that the functionality of the input device can perform.

The flow 300 continues at processing block 318, where the system converts the response data to the first format. The system can modify a format of the response data so that the input device can understand and use the response data. In some embodiments, the system can also change a type or structure of the data so that it can fit existing functionality of the input device. For example, if the response data included a sound message, but the system determines that the input device does not have functionality to present a sound message, or the functionality is turned off or disabled, but the input device does have a capability to present a text string, the system may convert words from the sound message into a text string and present the text string on a display of the input device. The system can also analyze the priority or significance of the response data and, based on a degree of the priority or significance, determine whether to route the response data to a different device that can present the response data in a specific way. In some embodiments, based on the priority or significance, the system may disregard some, or all, of the response data. For example, if the event in the wagering game indicates that a win occurs in the wagering game based on a wager and spin performed because of user input, the system may generate response data that specifies a celebratory effect. A celebratory effect may be a highly significant event, and, as a result, if the input device cannot perform in ways indicated in the response data, then the system may automatically present portions of the instructions from the response data using other peripheral devices. In other examples, however, if the event is not significant, and the device is unavailable or unable to perform certain activities associated with all, or a portion, of the response data, the system may disregard all, or the portion, of the response data.

The flow 300 continues at processing block 320, where the system provides the response data in the first format to indicate the event in the wagering game via the input device. For instance, the system transmits the response data to the input device. The input device can receive the response data in the first format, understand the response data, and use the response data as instructed by the wagering game.

Additional Example Embodiments

According to some embodiments, a wagering game system ("system") can provide various example devices, operations, etc., to control wagering game peripherals. The following non-exhaustive list enumerates some possible embodiments.

Some Embodiments Related to Community Wagering Games and Wagering-Game-Machine Banks.

In some embodiments, the system can detect an identifier (e.g., a player identifier, a wagering game identifier, and/or a wagering game identifier) associated with the input device and determine whether the identifier has been selected, from a group of eligible participants, to participate in an event for a community wagering game. For instance, the system can select one wagering game machine, or one wagering game participant, from a plurality of eligible wagering game machines or participants, for participation in a game-play event (e.g., a bonus game) for a community wagering game. The participants may be eligible because they have contributed, or are determined to be contributing at the time of selection, portions of wagers toward a jackpot progressive, or other collection of money. The system can select a wagering game machine at which the participant is logged in. The system can then select at least one input device associated with the wagering game machine and/or bank at which the participant is situated. In another example, the system can select a mobile device assigned to the wagering game participant at a location in a casino that is in proximity to a presentation device for the one or more events. After the system selects the participant, and the input device via that the participant can use during the community wagering game, the system can provide control to the input device for the one or more events of the community wagering game. In some embodiments, the system can transfer control to an input device assigned to a bank and authenticate the participant before converting or providing input to community wagering game via the input device. In other embodiments, the system can transfer control to a personal mobile device for the participant. The system detects input data from the input device and converts it as described previously, so that the participant can use the input device for the events of the community wagering game. In some embodiments, after the participant performs actions for the community wagering game, the system detects a second event for the community wagering game and selects a second input device associated with a second participant. In some embodiments, concurrently while the participant performs actions for the community wagering game, the system detects a second event for the community wagering game and selects a second input device associated with a second participant.

Figure 4:
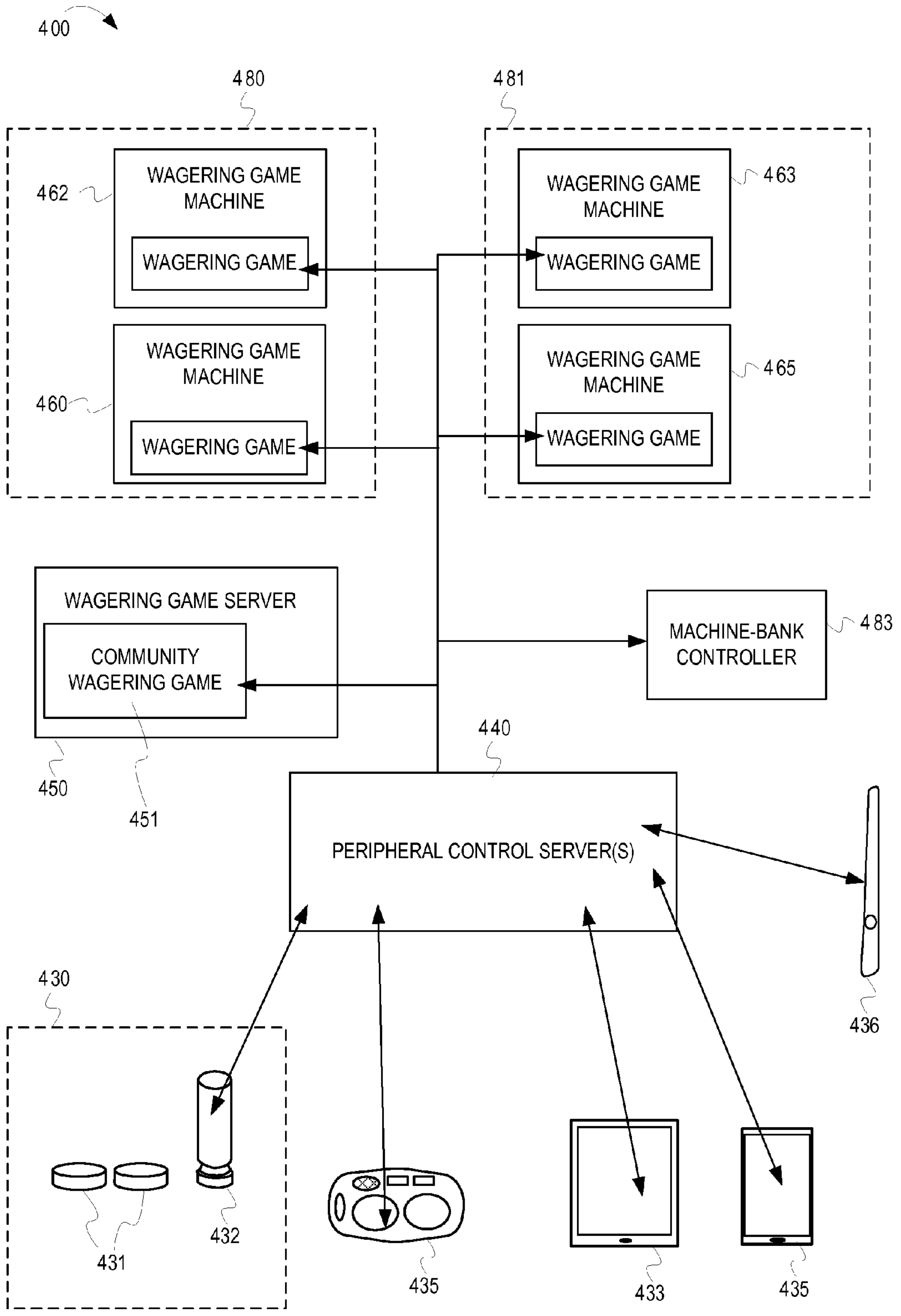
FIG. 4 is an illustration of controlling use of one or more peripherals for community wagering game events, according to some embodiments.

For example, in some embodiments, the system presents a community wagering game from which an event occurs, such as a bonus game that is associated with the community wagering game. Multiple wagering game machines in one or more banks may share a large display, on which the event (e.g., bonus game) is presented. A special peripheral can be used to interact with the event. For example, FIG. 4 illustrates an example wagering game system ("system") 400 where one or more wands 436 are tethered in a location associated with one or more banks of wagering game machines (e.g., bank 480 and 481). When one or more of the banks (e.g., bank, 480) goes into its bonus game associated with a community wagering game 451 (provided, for instance, by a wagering game server 450), the community wagering game 451 (and/or a machine-bank controller 483 that hosts the one or more wands 436) can request control of the one or more wands 436 from a peripheral control server 440. The system 400 then routes the control of the one or more wands 436 into that bonus game. Thus, one or more of the eligible players, or participants, that are selected to participate in the bonus game use the one or more wands 436. When the bonus ends, and another of the banks (e.g. second bank 481) initiates a separate bonus game, or a playing turn in the first bonus game, then the second bank 481 can obtain control of the one or more wands 436. Thus, wagering game machines 460, 462, 463, or 465, which are included in the banks 480 and 481, do not have to be configured to function with the one or more wands 436. Only the peripheral control server 440 would need to be configured to communicate with the one or more wands 436. However, in some embodiments, if any of the wagering game machines 460, 462, 463, or 465 want data from the one or more wands 436, then they can request that data from the peripheral control server 440.

Figure 5:
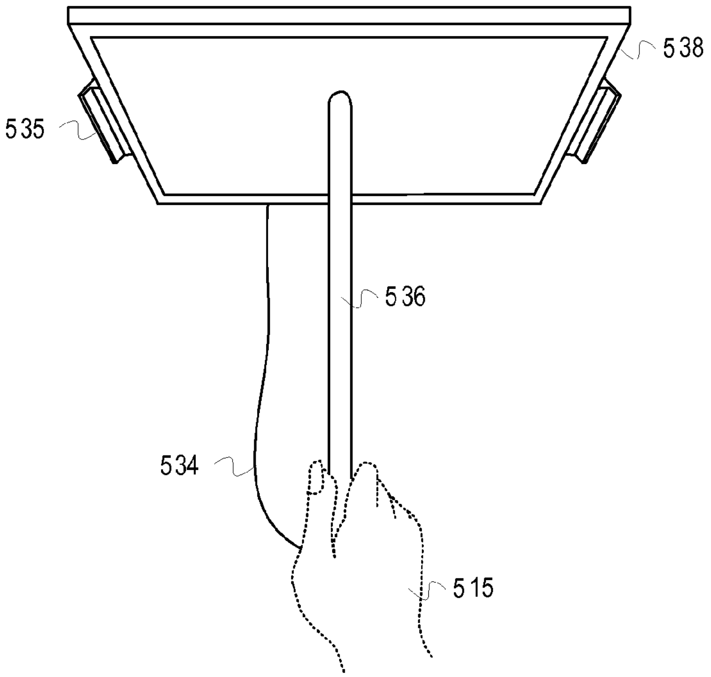
FIG. 5 is an illustration of an input device configured for use with wagering games, according to some embodiments.
Figure 5:
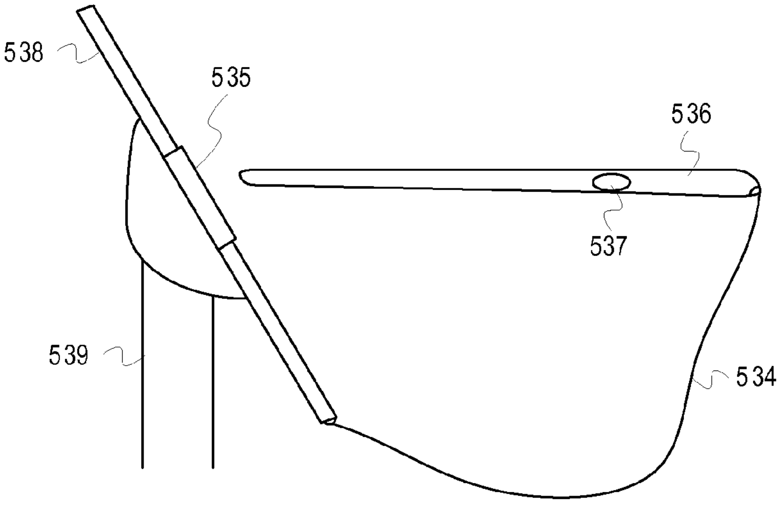

FIG. 5 illustrates an example of a wand and screen combination according to some embodiments. In FIG. 5, a screen 538 is connected to a wand 536 via a line 534. The screen 538 has fasteners 535 in which the wand 536 can be placed when not in use. When in use, a player 515 can grasp the wand 536 and move the wand 536 on, or in relation to, a face of the screen 538. For instance, the user 515 can tap the wand 536 to the screen 538 or make other movements on the surface of the screen 538. In some embodiments, the screen 538 senses the position of the wand 536 without direct contact with the wand 536. The wand 536 can have a button 537 to indicate or verify specific user actions and provide additional user input. The screen 538 can be attached to a stand 539 for stability. Electronic components (e.g., wires) can be encased within the stand 539.

Returning to the discussion of FIG. 4, in some embodiments, the system 400 can have more than one peripheral controller, such as one peripheral controller assigned to each of the banks 480 and 481 or to each of the wagering game machines 460, 462, 463, and 463 within the banks 480 and 481. Each of the peripheral controllers can have a variety of input devices, such as the controls 430 (e.g., buttons 431 and joystick 432), a fob 435, a tablet computer 433, a mobile phone 435, and/or a dedicated device assigned to one or more banks (e.g., the one or more wands 436) connected to the peripheral control server 440. The peripheral controllers can transfer control of devices between banks. In some embodiments, the system 400 can transfer control of an event for a community wagering game between various participants at different stations, or the wagering game machines 460, 461, 463 and/or 465, within any of the banks 480 and/or 481, so that a currently active input device associated with any of the peripheral controllers controls the event in the community wagering game.

Figure 6:
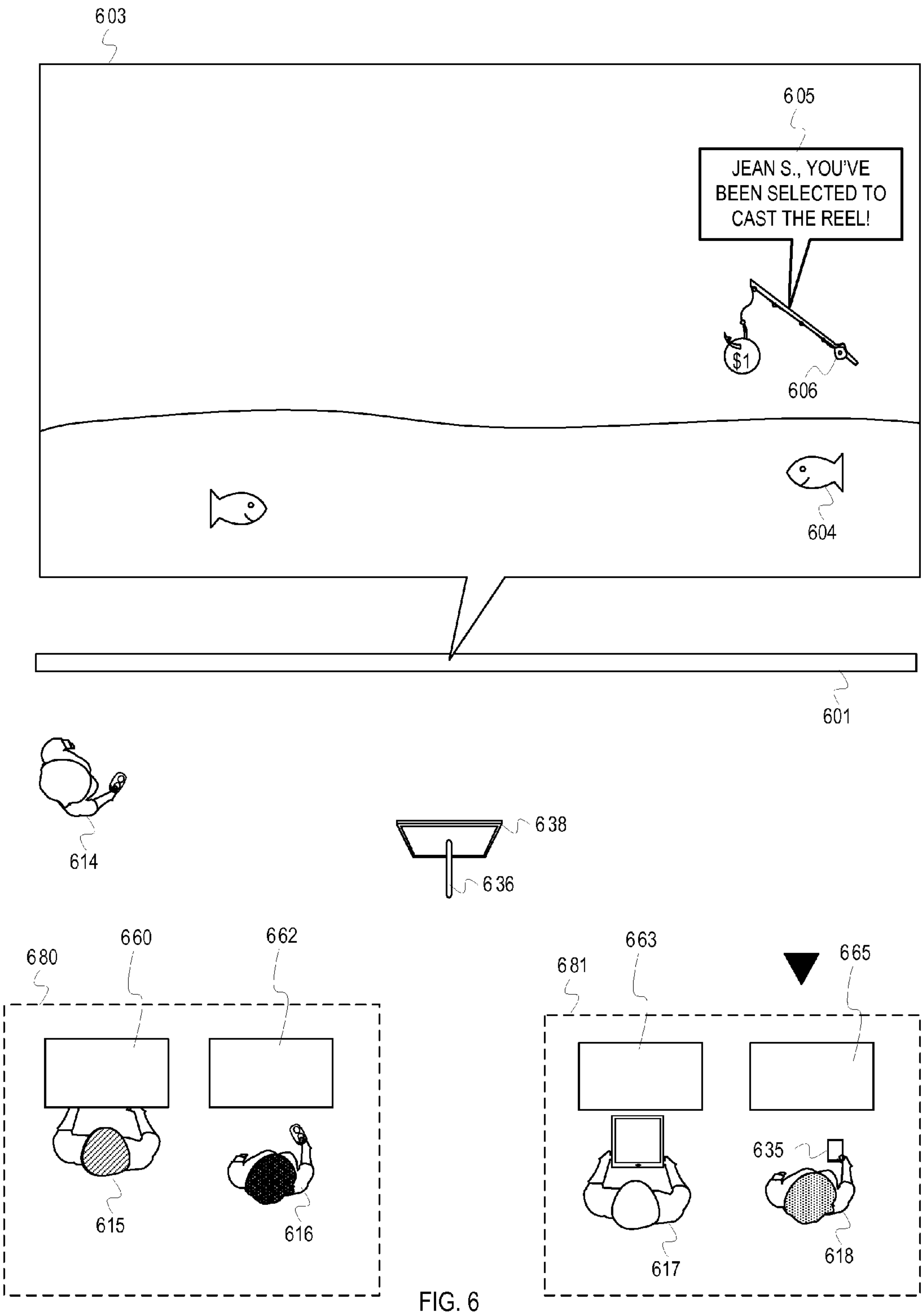
FIG. 6 is an illustration of controlling use of one or more peripherals for community wagering game events, according to some embodiments.
Figure 7:
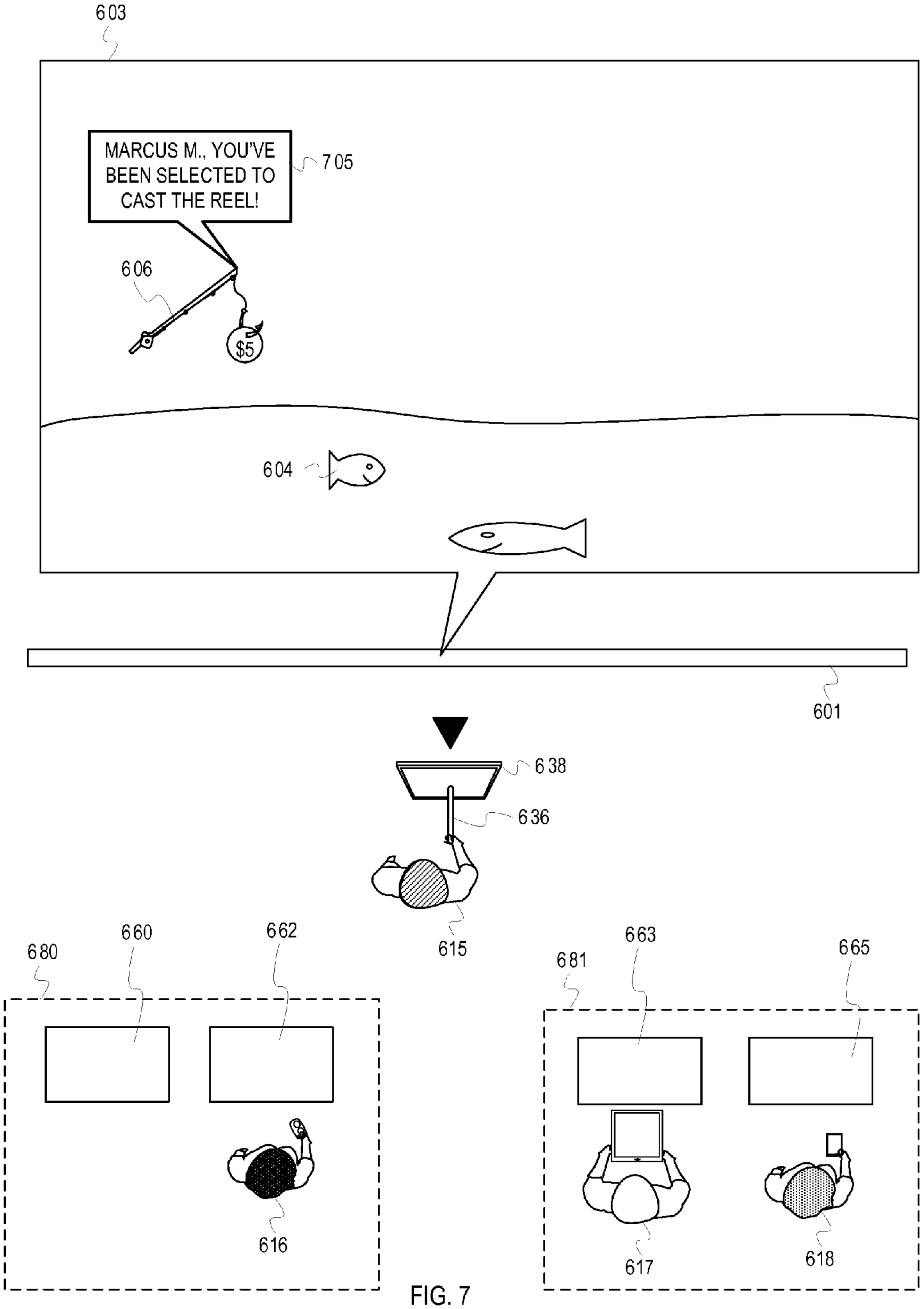
FIG. 7 is an illustration of controlling use of one or more peripherals for community wagering game events, according to some embodiments.

FIGS. 6 and 7 illustrate an example of transferring control of an event for a community wagering game between various participants. In FIG. 6, players 615, 616, 617, and 618 are stationed at wagering game machines 660, 662, 663 and 665. Wagering game machines 660 and 662 are in bank 680 and wagering game machines 663 and 665 are in bank 681. Each of the wagering game machines 660, 662, 663, and 665 may be controlled by one or more peripheral controllers, such as peripheral control servers, peripheral control processes, etc. Another player 614 is located near the bank 680. Each of the players 615, 616, 617, and 618 are eligible to participate in a community wagering game event for a community wagering game 603 presented on a shared display 601. For example, each of the players 615, 616, 617, and 618 may be contributing a portion of their wagers during their respective wagering game sessions to be eligible to participate in the community wagering game event. The player 614 may also be eligible based on other factors, such as game play in a recent gaming session, privileges earned via game play, player status, achievements in a persistent-state game, etc. A shared peripheral, the wand 636 and screen 638, are situated centrally to the display 601 and the banks 680 and 681. The wand 636 an screen 638 can be used to participate in the event. For instance, for the event, the community wagering game 603 may direct, via a notification 605, that one of the players, player 618 (e.g., the fictitious player "Jean S."), has been selected to perform an action in the community wagering game 603, such as to cast an animated reel 606 to attempt to catch one or more animated fish 604. A peripheral controller, in one example, passes control of the animated reel 606 to an active peripheral being used by the player 618, such as the smart phone 635, that can perform the actions required for casting the animated reel 606. For example, a peripheral controller detects that the smart phone 635 can generate input data based on gyroscopic devices within the smart phone 635, which gyroscopic devices can specify movement in multiple spatial dimensions (e.g., x, y, and z coordinates) as well as rotational movement and acceleration of movement. The peripheral controller also detects that the wand 636 can perform the movement and capabilities required by the community wagering game 603. Therefore, after determining that the smart phone 635 has capabilities required by the community wagering game 603 for casting the animated reel 606, the peripheral controller sends a message, either via the wagering game machine 665 and/or the smartphone 635, which message presents an option to the player 618 to select one of the available input devices, such as either the smart phone 635 or the wand 636 to control movement of the animated reel 606. The player 618, for instance, can select to use the smart phone 635 as an input device for casting the animated reel 606. The peripheral controller receives the data generated by the smart phone 635 and converts the data to a format understood by the community wagering game 603, which the community wagering game 603 uses to cast the animated reel 606. In FIG. 7, the player 615 is later selected to participate in the community wagering game event for the community wagering game 603, and the community wagering game 603 presents a message 705, that indicates that the player 615 (i.e., the fictitious user "Marcus M.") has been selected to cast the reel 606. A peripheral controller associated with the wagering game machine 660, however, determines that the wagering game machine 660 does not have an active input device that can perform the range of movement required by the community wagering game 603 for casting the animated reel 606. Thus, the peripheral controller sends a message via the wagering game machine 660 for the player 615 to use the wand 636. The peripheral controller passes control for casting the animated reel 606 to the wand 636. The wand 636 can require an authentication process prior to use, such as reading a finger print of the player 615 when the player 615 grasps the wand 636. In other embodiments, some community wagering games can receive input from multiple input devices concurrently, such as from the smart phone 635 and the wand 636 where the two players 615 and 618 compete against each other in the community wagering game 603. In other embodiments, the community wagering game 603 can receive input from competing banks, such as from any of the input devices associated with the banks 680 and 681 or banks 480 and 481 described in FIG. 4.

Some Embodiments that Utilize Player Data.

In some embodiments, the system can access player data (e.g., access player data stored on memory store assigned to the device) and where convert the player data from a first format to the second format, and transmit the player data to the wagering game process for use in the wagering game application. The player data may include, as examples, preferences, settings, calibrations, profile data, player history, avatar information, personalized content (e.g., ringtones, light show configurations, videos, pictures, sound files), etc. In some embodiments, the system accesses player data stored on the input device or in a memory store (e.g., database record(s)) associated with a player account on a server where a record in the database is assigned to an identifier for the player and/or the input device. In some embodiments, the system can access player data via the internet via the input device (e.g., via a web browser of the mobile device) and access online accounts, profiles, social networks, etc. associated with the player.

Some Embodiments that Utilize Non-Game-Control Data.

In some embodiments, the system can receive from the input device data that is not related to game control (e.g., data related to volume settings, chair movement, text messaging, emotive lighting, voice messaging, etc.). In some embodiments, the system can upload light-show data, such as via an application on a mobile device that is connected to a peripheral controller, and use the light show data to modify color schemes, customize emotive lighting shows, or otherwise use emotive lighting on a wagering game machine. In some embodiments, the system can access calibration and/or configuration settings for mobile device that is used as an input device. For example, different manufacturers of mobile phones have different accelerometers with different ranges, different sensitivity, etc. The system can calibrate an input devices' accelerometer and store a calibration file on the mobile phone, which the peripheral controller can utilize when the mobile phone is used as an input device for a wagering game. In some embodiments, the system can store and use customized commands related to a player or an input device (e.g., store voice control commands for game functions, such as a command that spins wagering game reels when a user speak "spin" into the mobile phone). The system can enable users to configure and store accessibility settings. For instance, an elderly player that has range-of-motion issues can calibrate their mobile phone to indicate a reel spin in response to a gentle waive of the mobile phone. The system can store a calibration file stored on the mobile phone, and pass the calibration file to a peripheral controller to use.

Some Embodiments to Store Data Associated with a Wagering Game Session.

In some embodiments, the system can store personalized information on an input device or a data store associated with the input device during the wagering game session. Later, when the input device is subsequently used in a subsequent wagering game session, the system can read the personalized information for the subsequent wagering game session.

Some Embodiments for Maintenance.

In some embodiments, the system can detect when a peripheral has an error, and then send a tilt message for the peripheral to receive maintenance from maintenance staff. The system can select a different input device assigned to a wagering game machine so that the player does not have to log out of the wagering game machine.

Some Embodiments for Hospitality and Other Casino Related Services.

In some embodiments, the system can use data associated with an input device for casino and hospitality services, such as for ordering drinks, purchasing show tickets, purchasing merchandise, player tracking, and other services that can be licensed to other manufacturers whose applications can access/subscribe to data from a peripheral controller.

Some Embodiments for Marketing Wagering Games.

In some embodiments, the system can use peripheral devices for marketing. For instance, the system can drive users to certain banks where a progressive is higher by sending notifications to mobile devices.

Additional Example Operating Environments

This section describes additional example operating environments and presents structural aspects of some embodiments.

Wagering Game Machine Architecture

Figure 8:
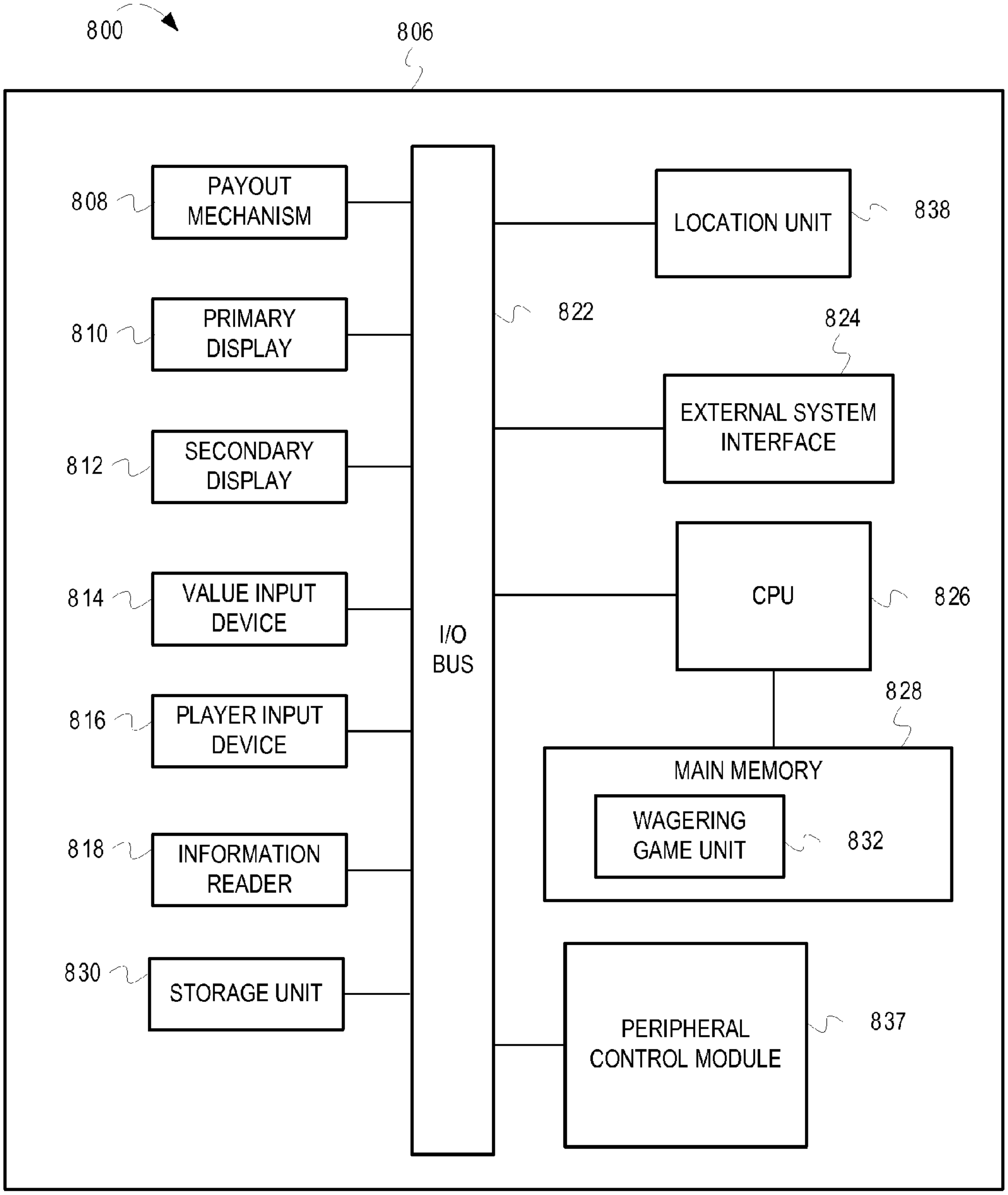
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a peripheral control module 837. The peripheral control module 837 can process communications, commands, or other information, where the processing can control wagering game peripherals.

Furthermore, any component of the wagering game machine 806 can include hardware, firmware, and/or machine-readable storage media including instructions for performing the operations described herein.

Wagering Game Machine

Figure 9:
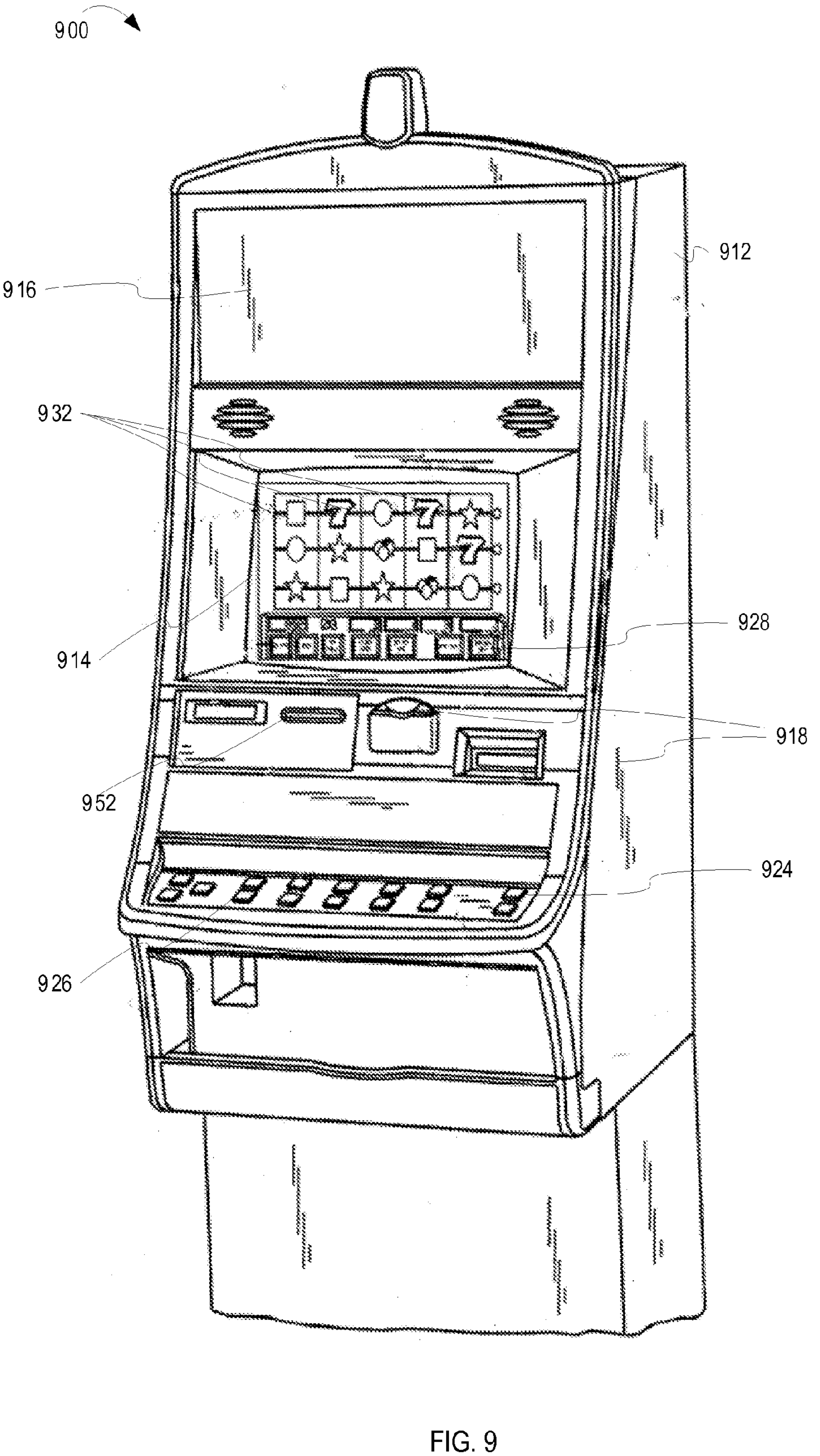
FIG. 9 is an illustration of a wagering game machine 900, according to some embodiments.

FIG. 9 is a conceptual diagram that illustrates an example of a wagering game machine 900, according to some embodiments. Referring to FIG. 9, the wagering game machine 900 can be used in gaming establishments, such as casinos. According to some embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), a three-dimensional (3D) display, or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bar top model, mobile handheld model, or workstation console model.

A player begins playing a basic wagering game by making a wager via the value input device 918. The player can initiate play by using the player input device's buttons or touch screen 928. The basic game can include arranging a plurality of symbols 932 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method of operating a wagering game system primarily dedicated to conducting a wagering game on a wagering game machine, the wagering game machine including a housing, one or more controllers, an electronic display device, a value input device, and a player input device, the electronic display device, the value input device, and the player input device being coupled to the housing, the method comprising:

establishing a connection with an input device, from a plurality of input devices configured for user input, for use in the wagering game presented via the wagering game machine during a wagering game session;

determining that the wagering game requests a type of input data;

determining, by a peripheral controller communicably coupled to the wagering game machine, that the input device is capable of generating the type of input data;

authorizing, by the peripheral controller, use of the input device in response to the determining that the input device is capable of generating the type of input data;

receiving input data from the input device, wherein the input data has a first format specific to the input device, and wherein the wagering game requires the input data in a second format different from the first format;

converting, via at least one of one or more processors of the peripheral controller, the input data from the first format to the second format required by the wagering game; and providing, via at least one of the one or more processors of the peripheral controller, the input data to the wagering game in the second format for use as the user input for the wagering game.

2. The computer-implemented method of claim 1, wherein the input data is generated via the input device in the first format according to one or more manufacturing-specific data formats of a manufacturer of the input device, and wherein the second format is one or more standardized data formats used for wagering games.

3. The computer-implemented method of claim 1 further comprising:

detecting a unique identifier of the input device;

searching a data store that specifies types of devices authorized for use during the wagering game session; and determining, in response to the searching, that the unique identifier of the input device is associated with at least one of the types of devices, wherein the converting the input data from the first format to the second format is in response to the determining that the unique identifier is associated with the at least one of the types of devices.

4. The computer-implemented method of claim 1 further comprising:

determining a purpose for use of the input device in the wagering game; and determining that the input device is authorized for the purpose;

wherein the converting the input data from the first format to the second format is in response to the determining that the input device is authorized for the purpose.

5. The computer-implemented method of claim 1 further comprising:

determining that a player identifier associated with the input device is selected, from a group of eligible players, for participation in an event for the wagering game; and authorizing use of the input device based on the determining that the player identifier is selected.

6. The computer-implemented method of claim 5, further comprising detecting authentication information for a player account associated with the player identifier via the input device, wherein the authorizing the use of the input device is based on the authentication information.

7. The computer-implemented method of claim 1 further comprising:

determining that the wagering game generates an event in response to the input data;

receiving response data from the wagering game in the second format in response to the event in the wagering game;

determining that the input device has functionality that can respond to the response data;

converting the response data to the first format in response to the determining that the input device has the functionality that can respond to the response data; and providing the response data in the first format for indication of the event in the wagering game via the input device.

8. The computer-implemented method of claim 1 further comprising:

prior to converting the input data from the first format to the second format, determining that a second input device, selected from the plurality of input devices, is not authorized for use with the wagering game;

determining that the input device is authorized for use with the wagering game; and providing, for presentation via the wagering game machine, an indicator that that the input device is authorized instead of the second input device.

9. The computer-implemented method of claim 1 further comprising:

prior to converting the input data from the first format to the second format, requesting, from the input device, activation of one or more input controls of the input device;

detecting the activation of the one or more input controls; and configuring the input device for use with the wagering game based on the activation of the one or more input controls.

10. The computer-implemented method of claim 9, wherein the wagering game requires a number of different types of input, and wherein the configuring the input device for use with the wagering game based on the activation of the one or more input controls comprises determining that the activation of the one or more input controls provides at least the number of different types of input required by the wagering game.

11. One or more machine-readable storage media having instructions stored thereon, which when executed by a set of one or more processors causes the set of one or more processors to perform operations comprising:

establishing a connection with an input device, from a plurality of input devices configured for user input, for use in a wagering game presented via a wagering game machine during a wagering game session;

determining that the wagering game requests a type of input data;

determining, by a peripheral controller communicably coupled to the wagering game machine, that the input device is capable of generating the type of input data;

authorizing, by the peripheral controller, use of the input device in response to the determining that the input device is capable of generating the type of input data;

receiving input data from the input device, wherein the input data has a first format specific to the input device, and wherein the wagering game requires the input data in a second format different from the first format;

converting, by the peripheral controller, the input data from the first format to the second format required by the wagering game; and providing the input data to the wagering game in the second format for use as the user input for the wagering game.

12. The one or more machine-readable storage media of claim 11, wherein the input data is generated via the input device in the first format according to one or more manufacturing-specific data formats of a manufacturer of the input device, and wherein the second format is one or more standardized data formats used for wagering games.

13. The one or more machine-readable storage media of claim 11, said operations further comprising:

detecting a unique identifier of the input device;

searching a data store that specifies types of devices authorized for use during the wagering game session; and determining, in response to the searching, that the unique identifier of the input device is associated with at least one of the types of devices, wherein the converting the input data from the first format to the second format is in response to the determining that the unique identifier is associated with the at least one of the types of devices.

14. The one or more machine-readable storage media of claim 11, said operations further comprising:

determining a purpose for use of the input device in the wagering game; and determining that the input device is authorized for the purpose;

wherein the input data is converted from the first format to the second format in response to the determining that the input device is authorized for the purpose.

15. The one or more machine-readable storage media of claim 11, said operations further comprising:

determining that a player identifier associated with the input device is selected, from a group of eligible players, for participation in an event for the wagering game; and authorizing use of the input device based on the determining that the player identifier is selected.

16. The one or more machine-readable storage media of claim 15, said operations further comprising detecting authentication information for a player account associated with the player identifier via the input device, wherein the authorizing the use of the input device is based on the authentication information.

17. The one or more machine-readable storage media of claim 11, said operations further comprising:

determining that the wagering game generates an event in response to the input data;

receiving response data from the wagering game in the second format in response to the event in the wagering game;

determining that the input device has functionality that can respond to the response data;

converting the response data to the first format in response to the determining that the input device has the functionality that can respond to the response data; and providing the response data in the first format for indication of the event in the wagering game via the input device.

18. The one or more machine-readable storage media of claim 11, said operations further comprising:

prior to converting the input data from the first format to the second format, determining that a second input device, selected from the plurality of input devices, is not authorized for use with the wagering game;

determining that the input device is authorized for use with the wagering game; and providing, for presentation via the wagering game machine, an indicator that that the input device is authorized instead of the second input device.

19. The one or more machine-readable storage media of claim 11, said operations further comprising:

prior to converting the input data from the first format to the second format, requesting, from the input device, activation of one or more input controls of the input device;

detecting the activation of the one or more input controls; and configuring the input device for use with the wagering game based on the activation of the one or more input controls.

20. The one or more machine-readable storage media of claim 19, wherein the wagering game requires a number of different types of input, and wherein configuring the input device for use with the wagering game based on the activation of the one or more input controls comprises determining that the activation of the one or more input controls provides at least the number of different types of input required by the wagering game.

21. A system primarily dedicated to playing a wagering game comprising:

a wagering game machine having a housing, the housing coupled to one or more controllers, an electronic display device, a value input device, and a player input device, wherein the wagering game machine presents the wagering game;

a peripheral controller communicably coupled to the wagering game machine, the peripheral controller having one or more processors; and one or more memory storage devices configured to store instructions, which when executed by at least one of the one or more processors, cause the system to perform operations to:

detect a connection between an input device and the wagering game machine;

determining that the wagering game requests a type of input data;

determine that the input device is capable of generating the type of input data;

authorize use of the input device after determination that the input device is capable of generating the type of input data;

detect input data from the input device as user input for the wagering game, wherein the input data has a first format specific to the input device, and wherein the wagering game requires the input data in a second format different from the first format, convert the input data from the first format to the second format required by the wagering game, and provide the input data to the wagering game in the second format for use as the user input for the wagering game.

22. The system of claim 21, wherein the input data is generated via the input device in the first format according to one or more manufacturing-specific data formats of a manufacturer of the input device, and wherein the second format is one or more standardized data formats used for wagering games.

23. The system of claim 21, wherein the one or more memory storage devices are configured to store instructions, which when executed by at least one of the one or more processors, cause the system to further perform operations to:

detect a unique identifier of the input device;

search a data store that specifies types of devices authorized for use during a wagering game session; and determine that the unique identifier of the input device is associated with at least one of the types of devices, wherein the input data is converted from the first format to the second format in response to determination that the unique identifier is associated with the at least one of the types of devices.

24. The system of claim 21, wherein the one or more memory storage devices are configured to store instructions, which when executed by at least one of the one or more processors, cause the system to further perform operations to:

determine a purpose for use of the input device in the wagering game; and determine that the input device is authorized for the purpose, wherein the input data is converted from the first format to the second format in response to determination that the input device is authorized for the purpose.

25. The system of claim 21, wherein the one or more memory storage devices are configured to store instructions, which when executed by at least one of the one or more processors, cause the system to further perform operations to:

determine that a player identifier associated with the input device is selected, from a group of eligible players, for participation in an event for the wagering game; and authorize use of the input device based on determination that the player identifier is selected.

26. The system of claim 25, wherein the one or more memory storage devices are configured to store instructions, which when executed by at least one of the one or more processors, cause the system to further perform operations to detect authentication information for a player account associated with the player identifier via the input device, wherein the operation to authorize the use of the input device is based on the authentication information.

27. The system of claim 21, wherein the one or more memory storage devices are configured to store instructions, which when executed by at least one of the one or more processors, cause the system to further perform operations to:

determine that the wagering game generates an event in response to the input data;

receive response data from the wagering game in the second format in response to the event in the wagering game;

determine that the input device has functionality that can respond to the response data;

convert the response data to the first format in response to determination that the input device has the functionality that can respond to the response data; and provide the response data in the first format to the input device to indicate the event.

28. The system of claim 21, wherein the one or more memory storage devices are configured to store instructions, which when executed by at least one of the one or more processors, cause the system to further perform operations to:

prior to the input data being converted from the first format to the second format, determine that a second input device, selected from a plurality of input devices, is not authorized for use with the wagering game;

determine that the input device is authorized for use with the wagering game; and provide, for presentation via the wagering game machine, an indicator that that the input device is authorized instead of the second input device.

29. The system of claim 21, wherein the one or more memory storage devices are configured to store instructions, which when executed by at least one of the one or more processors, cause the system to further perform operations to:

prior to the input data being converted from the first format to the second format, request, from the input device, activation of one or more input controls of the input device;

detect the activation of the one or more input controls; and configure the input device for the wagering game based on the activation of the one or more input controls.

30. The system of claim 29, wherein the wagering game requires a number of different types of input, and wherein the operation to configure the input device for the wagering game based on the activation of the one or more input controls comprises an operation to determine that the activation of the one or more input controls provides at least the number of different types of input required by the wagering game.

* * * * *